US006843576B2

(12) United States Patent
Blakley

(10) Patent No.: US 6,843,576 B2
(45) Date of Patent: Jan. 18, 2005

(54) CONTINUOUSLY VARIABLE ANALOG MICRO-MIRROR DEVICE

(75) Inventor: Daniel Robert Blakley, Philomath, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 130 days.

(21) Appl. No.: 10/677,939

(22) Filed: Oct. 1, 2003

(65) Prior Publication Data

US 2004/0080806 A1 Apr. 29, 2004

Related U.S. Application Data

(62) Division of application No. 10/282,363, filed on Oct. 28, 2001, now Pat. No. 6,666,561.

(51) Int. Cl.[7] .............................................. G02B 7/182
(52) U.S. Cl. ....................... 359/877; 359/871; 359/872; 359/220; 359/221; 359/222; 359/223; 359/224; 359/225; 359/226
(58) Field of Search ........................ 359/877, 871–872, 359/198, 220–226, 279, 290, 298; 385/16–18, 25

(56) References Cited

U.S. PATENT DOCUMENTS

| | | | |
|---|---|---|---|
| 5,061,049 A | 10/1991 | Hornbeck | |
| 5,430,571 A | 7/1995 | Witteveen | |
| 5,629,790 A | 5/1997 | Neukermans et al. | |
| 5,796,508 A | 8/1998 | Suzuki | |
| 6,002,507 A | 12/1999 | Floyd et al. | |
| 6,014,240 A | 1/2000 | Floyd et al. | |
| 6,028,689 A | 2/2000 | Michalicek et al. | |
| 6,040,935 A | 3/2000 | Michalicek | |
| 6,154,302 A | 11/2000 | Yagi et al. | |
| 6,201,629 B1 | 3/2001 | McClelland et al. | |
| 6,259,550 B1 | 7/2001 | Gottfried et al. | |
| 6,388,789 B1 | 5/2002 | Bernstein | |
| 6,600,851 B2 | 7/2003 | Aksyuk et al. | |
| 2001/0022682 A1 | 9/2001 | McClelland et al. | |
| 2002/0021058 A1 | 2/2002 | McClelland et al. | |
| 2002/0067534 A1 | 6/2002 | Hoil et al. | |
| 2002/0075554 A1 | 6/2002 | Brophy et al. | |
| 2002/0093721 A1 | 7/2002 | Knipe | |
| 2002/0095618 A1 | 7/2002 | Orcutt et al. | |

FOREIGN PATENT DOCUMENTS

| | | |
|---|---|---|
| EP | 0667975 B1 | 2/1997 |
| EP | 1017038 A2 | 7/2000 |
| JP | 2002193899 | 7/2000 |

OTHER PUBLICATIONS

K.E. Peterson, "Micromechanical light modulator aray fabricated on silicon", Applied Physics Letters, V. 31(8), Oct. 15, 1977, pp 521–523.

V.P. Jaecklin et al, "Optical Microshutters and Torsional Micromirors for Light Modulator Arrays", Proc. IEEE Workshop on Micro Electro Mechanical Systems, Feb. 7–10, 1993, pp 124–127.

R.R. A. Syms, "Equilibrium of Hinged and Hingeless Structures Rotated Using Surface Tension Forces", J. Microelectromechanical Systems, V. 4(4), Dec. 95 177–184.

A. Feinerman et al, Fast Micro–mirrors with large angle deflections, http://www.darpa.mil/mto/stab/kickoff/stab_uic.pdf, Aug. 8–9, 2000.

D.C. McCarthy, "Photonic Switches: Fast, but Functional?" Photonics Spectra, Mar. 1, 2001, pp 140–150.

R.E. Brooks, "Micromechanical light modulators on silicon", Optical Engineering, V. 24(1), Jan–Feb, 1985, pp 101–106.

A. Feinerman et al, "Agile Micro–Mirrors with Three Degrees of Freedom Manufactured with LIquid MEMS Technology" Free Space Laser Communication and Laser Imaging Proc. SPIE, V. 4489, 2002, pp 166–176.

*Primary Examiner*—Mohammad Sikder

(57) ABSTRACT

A micro-mirror device includes a substrate, a reflective element spaced from the surface of the substrate, a pair of electrodes disposed adjacent to the surface of the substrate, spaced apart from each other, and disposed adjacent to opposite ends of the reflective element, and including a dielectric liquid disposed at least between the reflective element and the pair of electrodes. The reflective element is adapted to be positioned at any position within a continuous range between a first position and a second position in response to analog electrical signals applied to the pair of electrodes.

13 Claims, 2 Drawing Sheets

US 6,843,576 B2

CONTINUOUSLY VARIABLE ANALOG MICRO-MIRROR DEVICE

This application is a divisional of Application Ser. No. 10/282,363, filed Oct. 28, 2002, now U.S. Pat. No. 6,666, 561.

TECHNICAL FIELD

This invention relates generally to micro-optical devices and optical beam steering and more particularly to a continuously variable analog micro-mirror device.

BACKGROUND

There are many applications for light-beam steering devices that have high spatial and time resolution and high brightness, including applications in display of information for education, business, science, technology, health, sports, and entertainment. Some light-beam steering devices, such as digital light-mirror arrays and deformographic displays, have been applied for large-screen projection. For white light, light modulators such as the reflective digital mirror arrays have been developed with high optical efficiency, high fill-factors with resultant low pixelation, convenient electronic driving requirements, and thermal robustness.

Macroscopic scanners have employed mirrors moved by electromagnetic actuators such as "voice-coils" and associated drivers. Micro-mirror devices have used micro-actuators based on micro-electro-mechanical-system (MEMS) techniques. MEMS actuators have also been employed in other applications such as micro-motors, micro-switches, and valves for control of fluid flow. Micro-actuators have been formed on insulators or other substrates using micro-electronic techniques such as photolithography, vapor deposition, and etching.

A micro-mirror device can be operated as a light modulator for amplitude and/or phase modulation of incident light. One application of a micro-mirror device is in a display system. In such a system, multiple micro-mirror devices are arranged in an array such that each micro-mirror device provides one cell or pixel of the display. A conventional micro-mirror device includes an electrostatically actuated mirror supported for rotation about an axis of the mirror into either one of two stable positions. Thus, such a construction serves to provide both light and dark pixel elements corresponding to the two stable positions. For gray scale variation, binary pulse-width modulation has been applied to the tilt of each micro-mirror. Thus, conventional micro-mirror devices have frequently required a high frequency oscillation of the mirror and frequent switching of the mirror position and thus had need for high frequency circuits to drive the mirror. Binary pulse-width modulation has been accomplished by off-chip electronics, controlling on- or off-chip drivers.

Conventional micro-mirror devices must be sufficiently sized to permit rotation of the mirror relative to a supporting structure. Increasing the size of the micro-mirror device, however, reduces resolution of the display since fewer micro-mirror devices can occupy a given area. In addition, applied energies must be sufficient to generate a desired force needed to change the mirror position. Also, there are applications of micro-mirror devices that require positioning of the mirror in a continuous manner by application of an analog signal rather than requiring binary digital positioning controlled by a digital signal. Accordingly, it is desirable to minimize a size of a micro-mirror device so as to maximize the density of an array of such devices, and it is desirable as well to provide means for positioning the micro-mirror device in an analog fashion.

Some micro-mirrors have used a liquid-metal drop to support the mirror. Such a support allows the micro-mirror to adopt various positions in a continuous range, with tilting about axes with many different orientations.

While the various beam-steering devices have found widespread success in their applications, there are still unmet needs in the field of micro-optical beam steering, particularly for continuous-range analog beam steering.

BRIEF DESCRIPTION OF THE DRAWINGS

The features and advantages of the disclosure will readily be appreciated by persons skilled in the art from the following detailed description when read in conjunction with the drawings, wherein.

DETAILED DESCRIPTION OF EMBODIMENTS

Figure 1:
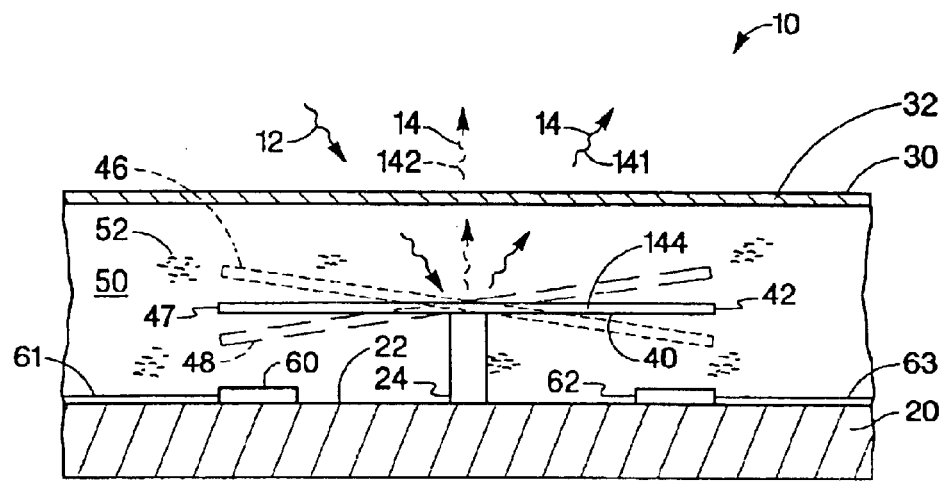
FIG. 1 is a schematic side elevation cross-sectional view of an embodiment of a micro-mirror device made in accordance with the invention.

For clarity of the description, the drawings are not drawn to a uniform scale. In particular, vertical and horizontal scales may differ from each other and may vary from one drawing to another. In this regard, directional terminology, such as "top," "bottom," "front," "back," "leading," "trailing," etc., is used with reference to the orientation of the drawing figure(s) being described. Because components of the invention can be positioned in a number of different orientations, the directional terminology is used for purposes of illustration and is in no way limiting.

One aspect of the invention provides a micro-mirror device 10. The micro-mirror device embodiment to be described first includes a substrate 20 having a surface 22 and a plate 30. Plate 30 is spaced from the surface 22 of the substrate and oriented substantially parallel to the surface of the substrate such that plate 30 and the surface 22 of the substrate define a cavity 50 between them. A dielectric liquid 52 is disposed in the cavity and a reflective element 42 is interposed between the surface 22 of substrate 20 and plate 30. Reflective element 42 is adapted to move to a selected position in a continuous range between a first position and at least one second position. Another aspect of the invention is a micro-mirror device 10 which relies on electrical to mechanical conversion to generate a force and cause movement or actuation of a body or element. Thus, micro-mirror device 10 is a MEMS device, a micro-electro-mechanical system.

In one embodiment, as described below, a plurality of micro-mirror devices 10 are arranged to form an array of micro-mirror devices. The array of micro-mirror devices may be used to form a display. Each micro-mirror device 10 constitutes a light modulator for modulation or steering of incident light. In an application to a display, each micro-mirror device may provide one cell or pixel of the display. Micro-mirror devices 10 may also be used in other imaging systems such as projectors and in optical addressing systems, as well as in instrumentation, such as spectrophotometers, plasmon resonance sensors, etc.

FIG. 1 illustrates one embodiment of a micro-mirror device 10. In this embodiment, micro-mirror device 10 includes a substrate 20, a plate 30, and an actuating element 40. Substrate 20 has a surface 22. In one embodiment, surface 22 is formed by a trench or tub formed in and/or on substrate 20. Plate 30 is oriented substantially parallel to surface 22 in this embodiment. Actuating element 40 is interposed between substrate 20 and plate 30 in cavity 50 and spaced from surface 22 of substrate 20 and from plate 30.

In one embodiment, actuating element 40 is actuated so as to move between a first position 46 and a second position 48 relative to substrate 20 and plate 30.

For example, actuating element 40 moves or tilts about an axis of rotation, tilting through a range of angles relative to substrate 20 and plate 30. Thus, the instantaneous position of actuating element 40 may be characterized by an angle relative to substrate 20 or plate 30. The axis of rotation of actuating element 40 may be parallel to substrate 20 or plate 30. In FIG. 1, the axis of rotation of actuating element 40 is perpendicular to the page. In moving in the range between first position 46 and second position 48, actuating element 40 may be in an intermediate position 47. Intermediate position 47 of actuating element 40 is illustrated in FIG. 1 as being substantially horizontal and substantially parallel to substrate 20. In some embodiments, intermediate position 47 may be a neutral or "rest" position occupied by actuating element 40 when no force is applied to cause movement or actuation of actuating element 40. For other embodiments, a different neutral or "rest" position may be chosen. In FIG. 1, both first and second positions 46 and 48 of actuating element 40 are illustrated as being oriented at an angle relative to intermediate position 47. Movement or actuation of actuating element 40 relative to substrate 20 and plate 30 is described in detail below.

In some embodiments, cavity 50 contains a dielectric liquid 52 such that actuating element 40 is in contact with dielectric liquid 52. In one embodiment, cavity 50 is filled with dielectric liquid 52 such that actuating element 40 is submerged in dielectric liquid 52. Thus, in such an embodiment, dielectric liquid 52 is disposed both between actuating element 40 and substrate 20 and between actuating element 40 and plate 30. Thus, dielectric liquid 52 contacts or wets opposite surfaces of actuating element 40. In another embodiment, cavity 50 is filled with dielectric liquid 52 such that actuating element 40 is positioned above dielectric liquid 52 and at least a surface of actuating element 40 facing substrate 20 is in contact with dielectric liquid 52. Dielectric liquid 52 enhances actuation of actuating element 40, increasing actuation force on actuating element 40 as generated by a given applied voltage as described below. For many applications, dielectric liquid 52 is substantially transparent and is clear or colorless in the visible spectrum. In addition, dielectric liquid 52 is chemically stable in electric fields, chemically stable with changes in temperature, and chemically inert. In addition, dielectric liquid 52 has a low vapor pressure and is non-corrosive. Furthermore, dielectric liquid 52 has a high molecular orientation in electric fields and moves in an electric field. Dielectric liquid 52 has a relatively low dielectric constant and a relatively high dipole moment. In addition, dielectric liquid 52 is generally flexible and has pi electrons available. Dielectric liquid 52 can transfer heat within the micro-mirror device by conduction and convection. Examples of liquids suitable for use as dielectric liquid 52 include phenyl-ethers, either alone or in blends (e.g., 2-, 3-, and 5-ring), phenyl-sulphides, and/or phenyl-selenides. In one illustrative embodiment, examples of liquids suitable for use as dielectric liquid 52 include a polyphenyl ether (PPE) such as OS138 and olive oil.

For some applications, with a suitable dielectric liquid 52 and suitable orientation of substrate 20, plate 30 may be omitted.

Plate 30, if present, is a transparent plate 32. In one embodiment, transparent plate 32 is a glass plate. Other suitable planar transparent or translucent materials, however, may be used. Examples of such materials include quartz and plastic.

Actuating element 40 includes a reflective element 42. Reflective element 42 includes a reflective surface 144. In one embodiment, reflective element 42 is formed of a uniform material having a suitable reflectivity to form reflective surface 144. Examples of such a material include polysilicon or a metal such as aluminum. In another embodiment, reflective element 42 is formed of a base material such as polysilicon with a reflective material such as aluminum or titanium nitride disposed on the base material to form reflective surface 144. In addition, reflective element 42 may be formed of a non-conductive material or may include or be formed of a conductive material.

As illustrated in the embodiment of FIG. 1, micro-mirror device 10 modulates light generated by a light source (not shown) located on a side of transparent plate 32 opposite of substrate 20. The light source may include ambient and/or artificial light, for example. Input light 12, incident on transparent plate 32, passes through transparent plate 32 into cavity 50 and is reflected by reflective surface 144 of reflective element 42 as output light 14. Thus, output light 14 passes out of cavity 50 and back through transparent plate 32. The direction of output light 14 is determined or controlled by the position of reflective element 42. For example, with reflective element 42 in intermediate position 47, output light 14 is directed in a first direction 141. However, with reflective element 42 in second position 48, output light 14 is directed in a second direction 142. Thus, micro-mirror device 10 modulates or varies the direction of output light 14 generated by input light 12. Thus, reflective element 42 can be used to steer light into, and/or away from, an optical system such as an optical imaging system.

In one embodiment, intermediate position 47 is a neutral position of reflective element 42 and represents a fully "ON" state of micro-mirror device 10 in that light is reflected, for example, to a viewer or onto a display screen, as described below. Thus, second position 48 is an actuated position of reflective element 42 and may represent a fully "OFF" state of micro-mirror device 10 in that light is not reflected, for example, to a viewer, though an aperture, or onto a display screen. Similarly, first position 46 is an actuated position of reflective element 42 and may represent a third state of micro-mirror device 10 in that light is reflected in a direction different than the directions for either intermediate position 47 or second position 48. Furthermore, first position 46, instead of intermediate position 47, may represent a fully "ON" state of micro-mirror device 10. At various positions between fully "ON" and fully "OFF" states of micro-mirror device 10, output light 14 is directed into various intermediate directions, thus providing continuously variable steering of output light 14 to any direction between the two ends of the range.

Figure 2:
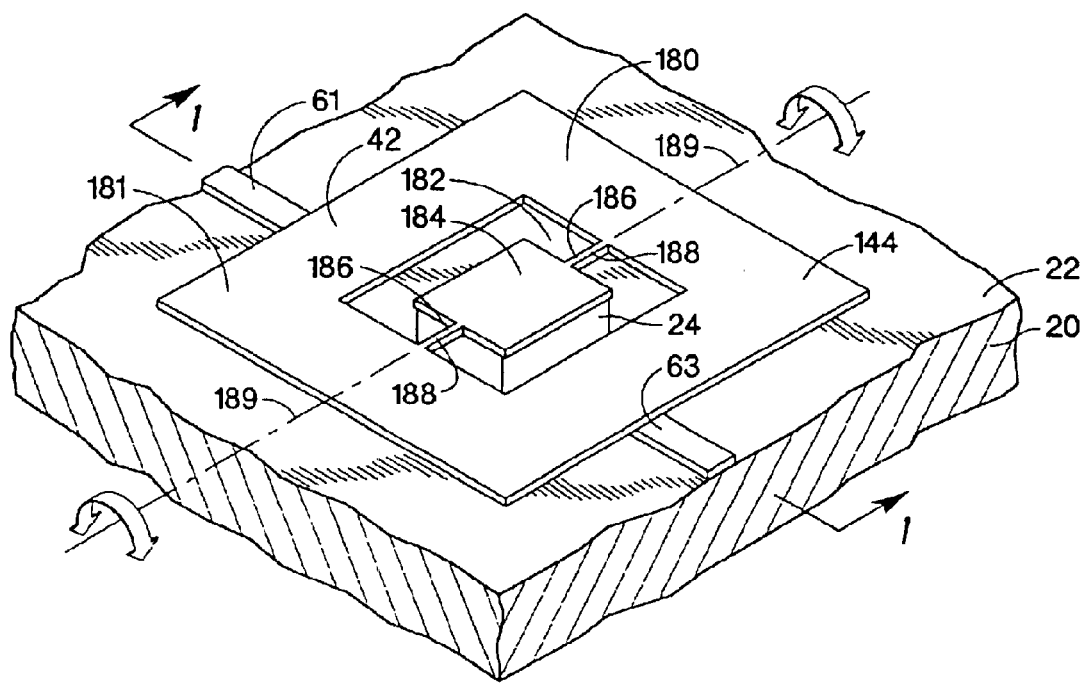
FIG. 2 is a perspective view illustrating one embodiment of a portion of a micro-mirror device made in accordance with the invention.

FIG. 2 illustrates one embodiment of reflective element 42, shown in a perspective view. Reflective element 42 has a reflective surface 144 and includes a substantially rectangular-shaped outer portion 180 and a substantially rectangular-shaped inner portion 184. In one embodiment, reflective surface 144 is formed on both outer portion 180 and inner portion 184.

Outer portion 180 has four contiguous side portions 181 arranged to form a substantially rectangular-shaped opening 182. Thus, inner portion 184 is positioned within opening 182. Inner portion 184 is positioned symmetrically within opening 182. In FIG. 2, reflective element 42 is shown in intermediate position 47 (cf. FIG. 1).

In one embodiment, a pair of hinges 186 extends between inner portion 184 and outer portion 180. Hinges 186 extend from opposite sides or edges of inner portion 184 to adjacent opposite sides or edges of outer portion 180. Outer portion 180 is supported by hinges 186 along an axis of symmetry. More specifically, outer portion 180 is supported about an axis that extends through the middle of its opposed edges. Thus, hinges 186 facilitate movement of reflective element 42 between first position 46 and second position 48, as described above (FIG. 1). More specifically, hinges 186 facilitate movement of outer portion 180 between first position 46 and second position 48 relative to inner portion 184. In one embodiment, hinges 186 include torsional members 188 having longitudinal axes 189 oriented substantially parallel to reflective surface 144. Longitudinal axes 189 are collinear and coincide with an axis of symmetry of reflective element 42. Thus, torsional members 188 twist or turn about longitudinal axes 189 to accommodate movement of outer portion 180 between first position 46 and second position 48 relative to inner portion 184. In other embodiments, hinges 186 include flexure members able to bend along longitudinal axes 189 oriented substantially parallel to reflective surface 144.

In one embodiment, reflective element 42 is supported relative to substrate 20 by a support or post 24 extending from surface 22 of substrate 20. More specifically, post 24 supports inner portion 184 of reflective element 42. Post 24 is positioned within side portions 181 of outer portion 180. Thus, outer portion 180 of reflective element 42 is supported from post 24 by hinges 186. In this embodiment, it is outer portion 180 that tilts to various angular positions relative to surface 22 of substrate 20.

Reflective element 42 is tilted to a desired position within its continuous range by differentially charging capacitor pads 60 and 62. Separate voltages may be applied to capacitor pads 60 and 62 through conductive paths 61 and 63 respectively (FIG. 1). Capacitor pads 60 and 62 are not visible in FIG. 2.

Two variable capacitors 220 and 230 (illustrated schematically in FIGS. 3-6) are formed by the structure illustrated in the embodiment of FIGS. 1 and 2. Reflective element 42 serves as a movable plate for both variable capacitors 220 and 230. Capacitor pads 60 and 62 serve as fixed plates. For simplicity and clarity, edge or fringe effects and stray capacitance are omitted from this description. Capacitor 220 consists generally of capacitor pad 60 and the nearest end of reflective element 42 (the left end as shown in FIG. 1), with dielectric liquid 52 as the capacitor's dielectric. Capacitor 230 consists generally of capacitor pad 62 and the nearest end of reflective element 42 (the right end as shown in FIG. 1), again with dielectric liquid 52 as the capacitor's dielectric. The capacitance values of capacitors 220 and 230 are coupled due to the fact that reflective element 42 is generally somewhat rigid. Thus, when reflective element 42 is in position 46, the distance between capacitor pad 62 and the right end of reflective element 42 is relatively small (providing higher capacitance) while the distance between capacitor pad 60 and the left end of reflective element 42 is relatively large (providing lower capacitance). Thus, capacitor 230 has relatively larger capacitance than capacitor 220 when reflective element 42 is in position 46. Conversely, when reflective element 42 is in position 48, the distance between capacitor pad 62 and the right end of reflective element 42 is relatively large (providing lower capacitance) while the distance between capacitor pad 60 and the left end of reflective element 42 is relatively small (providing higher capacitance). Thus, capacitor 220 has relatively larger capacitance than capacitor 230 when reflective element 42 is in position 48. When capacitor 220 increases in capacitance due to positioning of reflective element 42, capacitor 230 decreases in capacitance, and vice versa. Thus, as reflective element 42 pivots, the two capacitance values vary inversely. Capacitance values of both variable capacitors 220 and 230 are enhanced by the dielectric constant of dielectric liquid 52.

While the invention should not be construed as being limited to the consequences of any particular theory of operation, it is believed that micro-mirror device 10 performs its function by utilizing a linear relationship of position with differential capacitance. The differential capacitance of variable capacitors 220 and 230 (i.e., the difference between their instantaneous capacitance values) is linearly related to the position of reflective element 42. Thus, the differential capacitance may be used to sense the position of reflective element 42. The differential capacitance is linearly related to the position of reflective element 42 at every position within the full range of positions. If reflective element 42 is conductive along its entire length, capacitors 220 and 230 are effectively connected in series. An electrical coupling to the center pivoting axis of reflective element 42 provides a common connection to capacitors 220 and 230. That electrical coupling may be made through post 24 (e.g., through a conductive via extending through post 24) or may be made through either or both of hinges 186.

In normal operation, reflective element 42 does not tilt far enough to touch capacitor pads 60 and 62, which could short-circuit capacitors 220 and 230. However, to ensure that the short-circuiting of capacitors 220 and 230 is prevented, conventional mechanical stops (not shown) may be provided, as known in the art of conventional binary micro-mirror structures.

Figure 3:
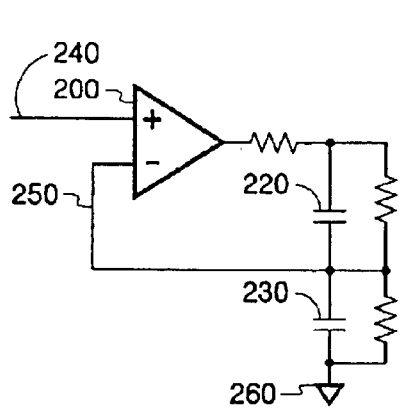
FIG. 3 is an electrical schematic diagram of a first circuit embodiment made in accordance with the invention.
Figure 4:
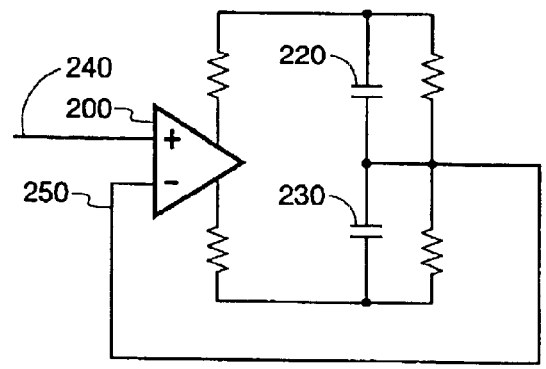
FIG. 4 is an electrical schematic diagram of a second circuit embodiment.
Figure 5:
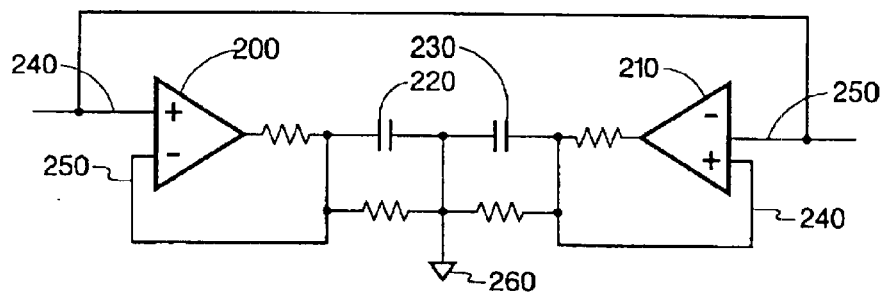
FIG. 5 an electrical schematic diagram of a third circuit embodiment.

FIGS. 3-6 are electrical schematic diagrams illustrating various embodiments of circuits accepting an analog electrical signal as their input and driving micro-mirror device 10. Variable capacitors 220 and 230, described above, form part of each circuit. As shown in FIG. 3, an operational amplifier 200 accepts as its non-inverting input 240 an analog signal for driving micro-mirror device 10. The output of the differential capacitance sensing is coupled to the inverting input 250 of operational amplifier 200. One of the capacitor pads 60 or 62 is connected to ground 260. In the circuit configuration shown in FIG. 3, the operational amplifier 200 drives the capacitors 220 and 230 in order to equalize the voltages at its non-inverting and inverting inputs. Thus micro-mirror device 10 is actuated by the electrostatic forces between the capacitor plates of variable capacitors 220 and 230, moving reflective element 42 accordingly. The analog input signal moves reflective element 42 to any desired position within its range. Since both capacitors 220 and 230 exert forces on reflective element 42 to move it, micro-mirror device 10 is actuated with more force than a conventional device driven electrostatically on one side. Since both capacitors 220 and 230 include dielectric liquid 52, the electrostatic force is enhanced by the dielectric constant of dielectric liquid 52. FIGS. 4 and 5 show alternative circuit embodiments using one operational amplifier 200 or two operational amplifiers 200 and 210 respectively.

Figure 6:
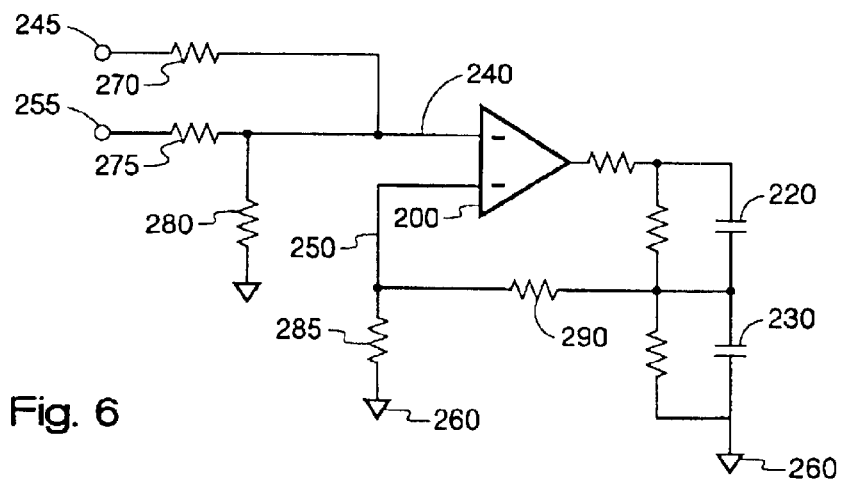
FIG. 6 is an electrical schematic diagram of a fourth circuit embodiment.

FIG. 6 shows an electrical schematic diagram illustrating a method for dithering (or "wobulating") the position of reflective element 42. The normal analog signal is applied to input 255 to steer reflective element 42 to its desired position. The dithering signal is applied to input 245 and mixed with the normal analog signal by a resistor network formed by resistors 270, 275, and 280. The mixed signal with a dithering signal superimposed on the normal analog driving signal is applied to the non-inverting input 240 of operational amplifier 200. Resistors 285 and 290 provide for the proper level of feedback signal level applied to inverting input 250. The dither signal applied at input 255 may be a sine wave, triangle, or square wave, for example. It may be synchronized with another input source if desired, or it may be unsynchronized.

Operational amplifiers 200 and 210 and the associated components provide drive circuitry for micro-mirror device 10. Such drive circuitry can be formed in substrate 20, using known methods of semiconductor integrated circuit fabrication.

Thus an aspect of the invention is a micro-mirror device, including a substrate, a pair of electrodes disposed adjacent to the surface of the substrate and spaced apart from each other, a reflective element spaced from the surface of the substrate, and a dielectric liquid disposed at least between the reflective element and the pair of electrodes. The reflective element is adapted to be positioned at any position within a continuous range between a first position and a second position in response to analog electrical signals applied to the pair of electrodes. In the embodiments illustrated, the first and second positions of the reflective element are oriented in directions on opposite sides of a neutral position of the micro-mirror device, but it is possible to make embodiments in which the first or second position of the reflective element is the neutral (unactuated) position of the micro-mirror device. Generally, the first position of the reflective element is oriented at an angle to the second position, and the first and second positions of the reflective element are both oriented at an angle to a neutral third position between the first and second positions.

Another aspect of the invention is a method of using such a micro-mirror device by electrically coupling to the pair of electrodes an operational amplifier operated by coupling the reflective element to the inverting input of the operational amplifier to provide position feedback. Applying an analog positioning signal to the non-inverting input of the operational amplifier actuates the micro-mirror device, whereby the reflective element is positioned at a selected position within a continuous range between a first position and a second position in response to the applied analog positioning signal. As described above, a dithering signal may also be mixed with the analog positioning signal.

Another aspect of the invention is a method of forming a micro-mirror device by providing a substrate, providing a plate spaced from the surface of the substrate and oriented substantially parallel to the surface of the substrate, thus defining a cavity between the plate and the substrate, disposing a dielectric liquid in the cavity, and interposing a reflective element between the surface of the substrate and the plate, the reflective element being adapted as described above to move to a selected position within a continuous range.

INDUSTRIAL APPLICABILITY

Devices made in accordance with the invention are useful in light-beam steering devices that have high spatial and time resolution, high brightness, and a continuous range of deflection angles, with low-frequency and low-power driving requirements. They may also be used in imaging systems such as projectors, in optical addressing applications, and in instrumentation applications.

Although the foregoing has been a description and illustration of specific embodiments of the invention, various modifications and changes thereto can be made by persons skilled in the art without departing from the scope and spirit of the invention as defined by the following claims. For example, at least one additional pair of capacitor pads may be disposed and adapted for pivoting a reflective element of the micro-mirror device about a second, nonparallel axis.

What is claimed is:

1. A method of using a micro-mirror device having a reflective element, a pair of electrodes spaced from the reflective element, and a dielectric liquid disposed at least between the reflective element and the pair of electrodes, said method comprising the steps of:

electrically coupling to the pair of electrodes an operational amplifier having an output for coupling to at least one of the pair of electrodes and having inverting and non-inverting inputs;

electrically coupling the reflective element to the inverting input of the operational amplifier to provide feedback; and applying an analog positioning signal to the non-inverting input of the operational amplifier, whereby the reflective element is positioned at a selected position within a continuous range between a first position and a second position in response to the applied analog positioning signal.

2. The method of claim 1, further comprising the step of:

mixing a dithering signal with said analog positioning signal.

3. A method of fabricating a micro-mirror device, the method comprising the steps of:

providing a substrate having a surface;

.5 providing a plate oriented substantially parallel to the surface of the substrate and spacing the plate from the surface of the substrate, including defining a cavity between the plate and the surface of the substrate;

disposing a dielectric liquid in the cavity; and interposing a reflective element between the surface of the substrate and the plate, wherein the reflective element is adapted to move to a selected position within a continuous range between a first position and a second position.

4. The method of claim 3, wherein the plate and the dielectric liquid are transparent.

5. The method of claim 3, wherein interposing the reflective element between the surface of the substrate and the plate includes submerging the reflective element in the dielectric liquid.

6. The method of claim 3, wherein interposing the reflective element between the surface of the substrate and the plate includes positioning the reflective element above the dielectric liquid.

7. The method of claim 3, wherein the second position of the reflective element is oriented at an angle to the first position.

8. The method of claim 3, further comprising:

extending at least one post from the surface of the substrate, wherein interposing the reflective element between the surface of the substrate and the transparent plate includes supporting the reflective element relative to the surface of the substrate from the at least one post.

9. The method of claim 8, further comprising:

extending at least one hinge between the at least one post and the reflective element, wherein the at least one hinge is adapted to facilitate movement of the reflective element between the first position and the at least one second position.

10. The method of claim 9, wherein the at least one hinge includes a torsional member adapted to twist about a longitudinal axis thereof.

11. The method of claim 9, wherein the at least one hinge includes a flexure member adapted to bend along a longitudinal axis thereof.

12. The method of claim 8, further comprising:

extending a conductive via through the at least one post and electrically coupling the conductive via with the reflective element.

13. A micro-mirror device fabricated by the method of claim 3.

* * * * *

UNITED STATES PATENT AND TRADEMARK OFFICE
CERTIFICATE OF CORRECTION

PATENT NO. : 6,843,576 B2 Page 1 of 1
DATED : January 18, 2005
INVENTOR(S) : Blakley It is certified that error appears in the above-identified patent and that said Letters Patent is hereby corrected as shown below:

<u>Column 8,</u>
Line 50, delete ".5".

Signed and Sealed this

Third Day of January, 2006

JON W. DUDAS
*Director of the United States Patent and Trademark Office*